United States Patent [19]

Stewart et al.

[11] Patent Number: 4,902,362
[45] Date of Patent: Feb. 20, 1990

[54] APPLIQUE ASSEMBLY METHOD FOR AUTOMOTIVE INSTRUMENT PANELS

[75] Inventors: Patrick J. Stewart, Kettering; James L. Webber, Spring Valley; Thomas E. Wylie, Brookville; Bill R. Otto, Tipp City; Jay C. Kellogg, Vandailia, all of Ohio

[73] Assignee: General Motors Corporation, Detroit, Mich.

[21] Appl. No.: 277,747

[22] Filed: Nov. 30, 1988

[51] Int. Cl.⁴ .......................... B32B 5/20; B32B 7/10
[52] U.S. Cl. ...................... 156/79; 156/245; 156/310; 264/46.6; 264/46.4; 428/317.1; 428/317.3
[58] Field of Search ............... 156/79, 310, 212, 213, 156/214, 245; 264/46.4, 46.5, 46.6, 46.7, 46.1; 428/317.1, 317.3, 317.7

[56] References Cited

U.S. PATENT DOCUMENTS

| | | | |
|---|---|---|---|
| 2,955,972 | 10/1960 | Wintermute et al. | 156/79 |
| 4,126,504 | 11/1978 | Wolinski et al. | 156/310 |
| 4,228,115 | 10/1980 | Gardner | 264/46.4 |
| 4,420,447 | 12/1983 | Nakashima | 264/46.4 |
| 4,734,230 | 3/1988 | Rhodes, Jr. et al. | 264/46.5 X |
| 4,769,278 | 9/1988 | Kamimura et al. | 156/245 X |

Primary Examiner—Michael W. Ball
Assistant Examiner—Michele K. Yoder
Attorney, Agent, or Firm—R. W. Tung

[57] ABSTRACT

A method for making a composite foam part includes the steps of forming a retainer member, forming a foam member having an outer skin portion and an inner barrier film portion, and applying a contact curable adhesive system to the retainer member and barrier film portion of the foam member. The retainer member is clamped against the barrier film portion of the foam member capturing the adhesive therebetween.

2 Claims, 3 Drawing Sheets

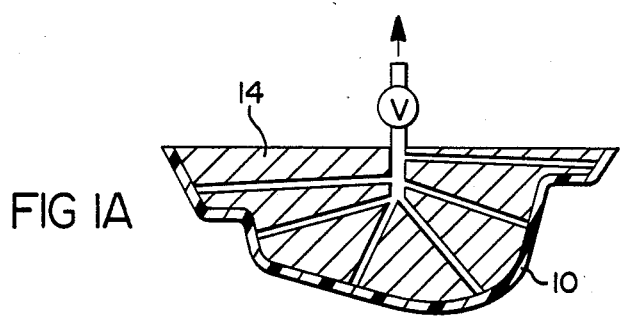
FIG IA
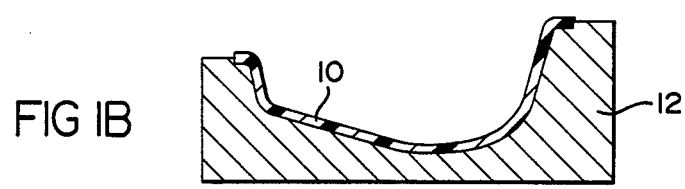
FIG IB
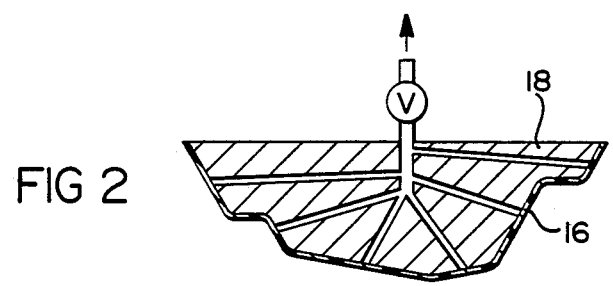
FIG 2
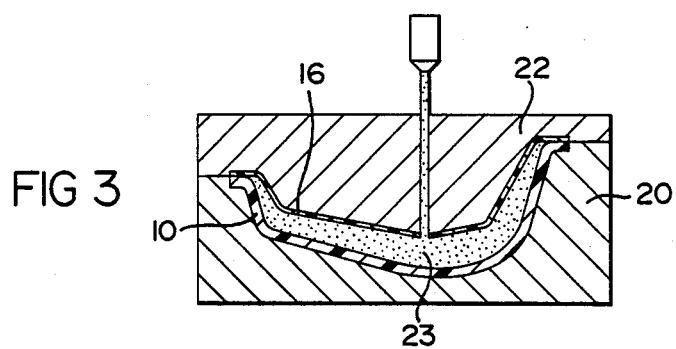
FIG 3
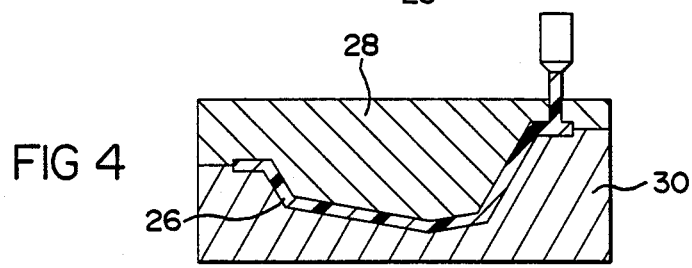
FIG 4

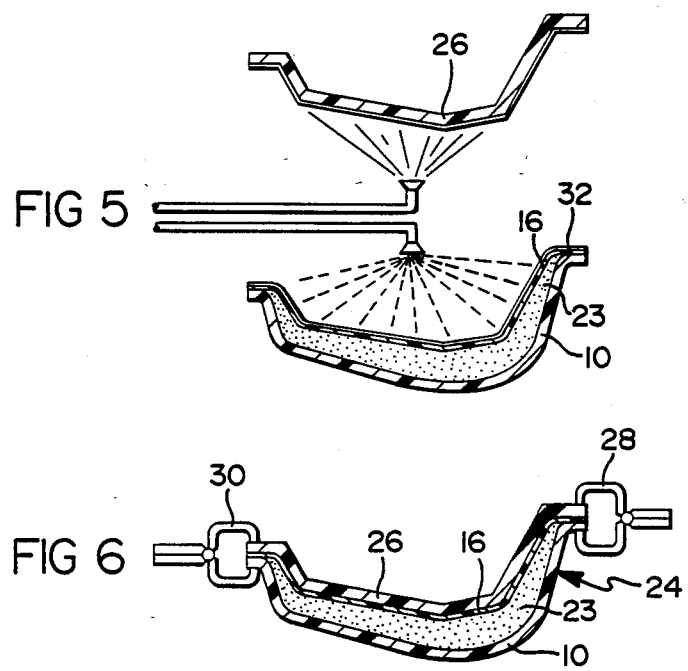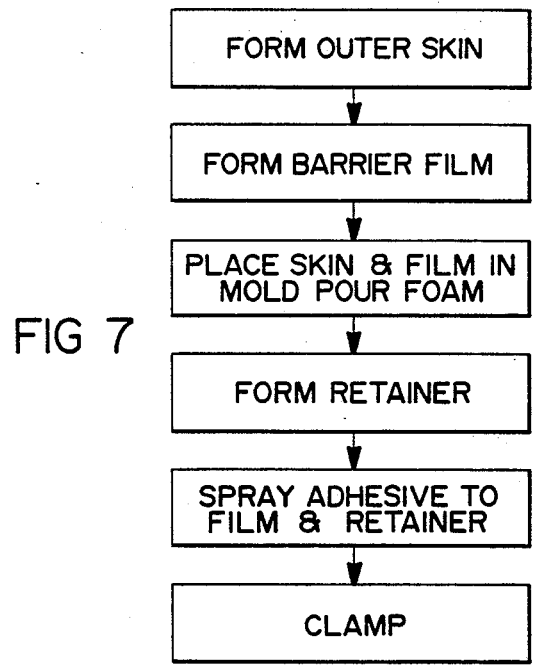

APPLIQUE ASSEMBLY METHOD FOR AUTOMOTIVE INSTRUMENT PANELS

TECHNICAL FIELD

This invention relates to methods for forming composite articles and more particularly to methods for making a composite foam part including a foam applique adhered to a rigid retainer member.

BACKGROUND

Our automotive instrument panels typically include a urethane foam cast between an outer vinyl skin and a barrier film, the barrier film being adhered by an adhesive to a rigid retainer member. Conventionally, the instrument panel is made by vacuum forming or powder slush casting a vinyl outer skin and injection molding a hard plastic retainer. The hard plastic retainer provides structural rigidity to the member. An adhesive is applied to the retainer, a barrier film is vacuum formed over the adhesive. Optionally, the holes in the retainer of the type for allowing instruments to pass therethrough are closed. The retainer assembly and vinyl outer skin are loaded into a foam mold. Foam is poured into the mold providing adhesion between the barrier film and the outer skin.

The U.S. Pat. Nos. 4,228,115 to Gardner et al, issued Oct. 14, 1980, and assigned to the assignee of the present application, and 4,420,447 to Nakashima, issued Dec. 13, 1983, both relate to processes for producing foam moldings. The Gardner et al patent discloses a method including the step of masking openings with heat shrink plastic during the injection foam step. The Nakashima patent discloses a process of pinching film between two mold blocks while a foaming process is executed on a foam mold material to form integrally a foam layer on a film covered side of an insert with the film being pressed against a preapplied adhesive on the insert. The present invention differs from both of the aforesaid patents by preforming the barrier film as a separate part of an applique to be described.

Applique technology has been utilized with small flat surfaces because of limitations with adhesive systems. Heat distortion and problems of mating of slide fit parts have limited this technology. For example, instrument panels are subjected to high temperatures causing considerable stress as the vinyl components of the foam applique revert back to a flat sheet. The adhesive utilized must withstand the stresses at high temperatures. Adhesives used on small flat applique parts in accordance with the prior art do not have the performance characteristics necessary to hold the stresses of larger parts such as instrument panels. Further, when fitting a covering of a complex three dimensional shape, such as applying an applique to a retainer member of an instrument panel, some sliding must occur. A mating fit of this type is not possible if one of the surfaces is sticky.

The present invention provides a solution to the aforementioned problems by providing a novel applique process applicable to the manufacturing of automotive instrument panels.

STATEMENT OF THE INVENTION

In accordance with the present invention there is provided a method of making a composite foam part including a foam applique adhered to a rigid retainer member, the method including the steps of forming the retainer member, forming a foam member having an outer skin portion and inner barrier film portion, and applying a contact curable adhesive to at least one of the retainer member or barrier film portion of the foam member. The retainer member is clamped to the barrier film portion of the foam member capturing the adhesive therebetween which cures when an adhesive component contacts an accelerator component of the adhesive system. The foam member is moved relative to the retainer member to assure desired positioning thereon as the adhesive system is cured to bond the retainer member to the foam member.

The present invention provides an applique process best realized when the retainer is relatively large, such as that used for instrument panels, compared to the area which is being covered with foam and vinyl. The present invention provides significant cost reduction due to less waste of materials, as conventional methods require large amounts of scrap vinyl and foam. There is foam mold quality improvement due to smaller foam areas and better seal off of the foaming cavity.

BRIEF DESCRIPTION OF THE DRAWINGS

Other advantages of the present invention will be readily appreciated as the same become better understood by reference to the following detailed description when considered in connection with the accompanying drawings wherein:

FIG. 1A is a diagrammatic view of a vacuum mold for forming an outer skin of a foam member and FIG. 1B is a diagrammatic view of a heated casting mold for forming an outer skin of a foam member;

FIG. 2 is a cross-sectional view of a mold for vacuum forming a barrier film of a foam member;

FIG. 3 is a cross-sectional view of a mold for pouring foam between a barrier and an outer skin of a foam member;

FIG. 4 is a cross-sectional view of a mold for forming a rigid retainer member;

FIG. 5 is a cross-sectional view of an adhesive applicator and an accelerator applicator in accordance with the present invention;

FIG. 6 is a cross-sectional view of the clamping apparatus in accordance with the present invention;

FIG. 7 is a flow chart showing the general steps of the method in accordance with the present invention;

DETAILED DESCRIPTION OF THE PREFERRED EMBODIMENT

Figure 8:
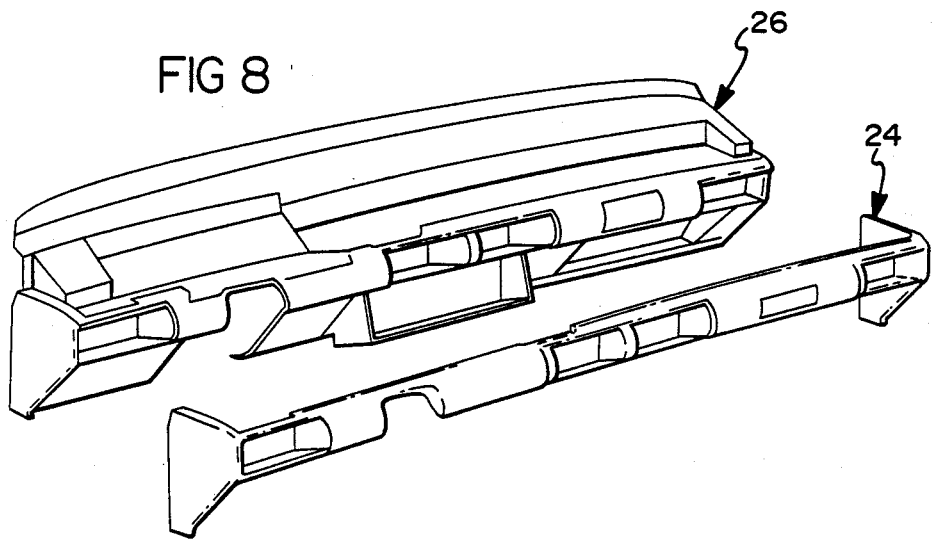
FIG. 8 is a perspective view of an instrument panel and a foam applique exploded therefrom.
Figure 9:
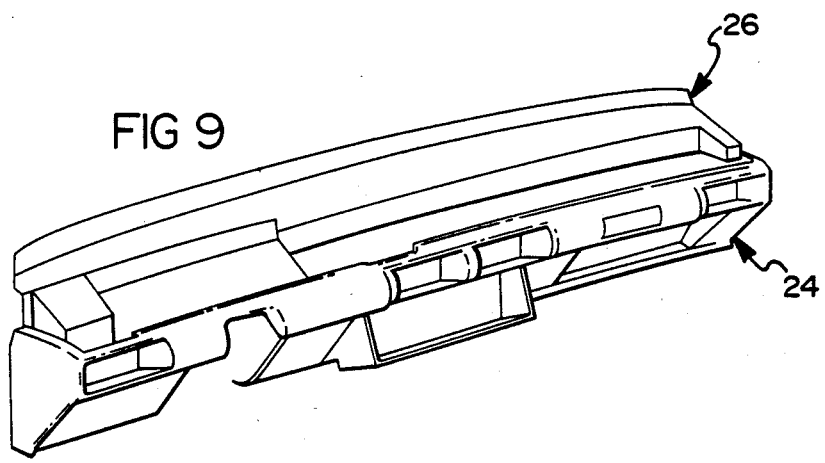
FIG. 9 is a perspective view of an instrument panel made in accordance with the present invention.

The present invention involves a unique series of steps to form a composite foam part. The steps are shown in FIGS. 1-6 and illustrated by a flow chart in FIG. 7.

Generally, a foam member having an outer skin portion and an inner barrier film portion are formed. As shown is FIG. 1, an outer skin 10 is either powder slush molded on a heated mold 12 or by vacuum forming a skin 10 on a male mold 14. The skin can be made from vinyl or other materials commonly used in the art. An inner barrier film is vacuum formed as shown in FIG. 2. The film 16 is vacuum formed on mold 18 as schematically shown. As shown in FIG. 3, the vinyl outer skin portion 10 and inner barrier film 16 are disposed in a third mold comprising mold halves 20 and 22. A foam material 23 is poured or injected between the inner barrier film 16 and outer vinyl skin 10 and foamed to form a unitary foam applique 24. The barrier film 16 and outer skin 10 shape match the lid 22 and base 20 of the mold to produce optimum foam seal at the mold edges.

As shown in FIG. 4, a rigid retainer member 26 is formed between mold halves 28 and 30 by injection molding techniques common to the art.

As shown in FIG. 5, adhesive is applied to the surface of the barrier film 16 and the accelerator for the adhesive is applied to the retainer member 26.

Finally, the retainer member 26 is clamped to the barrier film 16 by clamps 28, 30 capturing the adhesive and the accelerator therebetween.

Thusly, unlike prior art techniques wherein a foam is poured between a retainer having barrier film adhered thereto and an outer skin, the present invention provides a method of adhering foam appliques to a separately preformed retainer member.

A single or several appliques can be applied to a single separately preformed retainer member. Accordingly, openings in the retainer member need not be masked to prevent foam from pouring therethrough. The present invention does not require the step of pouring foam between a retainer member and an outer skin. There are less amounts of scrap vinyl and foam. Also, there are reduced finishing operations because less vinyl and excess foam need be trimmed. The aforementioned factors thereby provide higher foam quality and more design freedom.

Pursuant to the present invention, the foam applique is made separately and subsequently attached to retainer member 26. Thusly, the applique process is very useful for application to retainers with a relatively small area covered by foam and vinyl skin, as several small appliques can be applied to a single retainer member or built up upon each other.

Critical to the present invention is the adhesive bond between the applique and the retainer member. Preferably, a two component acrylic adhesive system is utilized. Acrylic adhesives are unique among two component structural adhesive in that there is no required mixing of the two components. Simply contacting the adhesive component with the accelerator component of the system will cure the material. The instantaneous "contact" speed of cure enables the speed of applique assembly to approximate high volume automotive assembly speeds. Comparable instrument panel assembly and automotive assembly speeds are especially desirable in just in time supply of parts from an automotive component supplier to an automobile assembly line. The present invention uses adhesive systems with an adhesive component which contact cures in less than two minutes when exposed to an accelerator component. Such speeds are not obtainable by use of epoxies based adhesives which have a room temperature cure speed in the range of 5 minutes. Urethane based adhesives can be cured in two minutes but in order to obtain such rates the urethane material reaction produces gassing which destroys the adhesive's strength. Preferably, the acrylic adhesive monomer is an off white liquid having a viscosity of between 10,000 and 26,000 cps. The adhesive is 100% reactive.

The preferred accelerator component of the adhesive contains 10% benzoyl peroxide, an acrylic resin, and solvents. The monomer components of the adhesive contains methyl methacrylate, acrylic polymer, silica thickener and a coconut odor mask. The adhesive cures by polymerization is initiated by the benzoyl peroxide at the surface of the dried accelerator. The polymerization is very fast close to the accelerator surface and slower as the distance from the surface increases. Since monomer which is over thirty mils away from the accelerator surface will not cure at all, it is important that the bond line be kept as thin as possible. One commercially available material having such characteristics is Versilok 202 ™, manufactured by Lord Industrial Corp., Erie, PA. Other manufacturers of suitable two component acrylic adhesive are H.B. Fuller, St. Paul, MN
Dexter Hysol, Olean, NY
Franklin Glue, Columbus, OH
Locktight Corp., Newington CT
Dymax Engineering Adhesives, Ann Arbor, MI.

During the application of the adhesive, a bead 32 of the acrylic adhesive monomer is applied to the barrier film 16 of the foam member 23. The accelerator component of the acrylic adhesive is sprayed on the facing of the retainer member. The parts are then clamped together as described above thereby forming the bonded applique.

The monomer bead application can either be by hand application or by an application controlled by a robot. Preferably, the monomer bead should be 3/32 inch in diameter. This diameter is not critical and can be changed to vary with an application amount. The length and placement of the monomer bead can be changed by the robot program.

The clamping operation is optimized by varying either the clamping pressure or clamp time. The clamp pressure must be sufficient to squeeze out the monomer bead. The clamp time must be sufficient for the adhesive to cure and gain strength. As stated above, the thicker sections of adhesive take longer to gain strength than the thinner sections.

Utilizing the adhesive described above, the accelerator must be dry before the clamping operation. The accelerator dries in about one minute. The monomer portion should be used immediately once applied since the methyl methacrylate of the monomer portion is volatile and will evaporate over a time. The monomer will skin over but will still be functional up to about four hours after application. This depends on the size of the bead diameter and also on the ambient temperature.

The embodiments of the invention in which an exclusive property or privilege is claimed are defined as follows:

1. In a method of making a composite foam part with preformed components having a three dimensional fit including adhering a foam applique to a rigid retainer member at three dimensional points thereon, the improvement comprising:

forming the retainer member;
forming a foam applique member by placing an outer skin portion and an inner barrier film portion in a mold, pouring a precursor of the foam material therebetween, foaming and setting the foam material to form the integral foam member;
and then applying contact curable adhesive monomer to at least one of the retainer member or barrier film portion of the foam member;
applying an accelerator component of said adhesive monomer to the other of the retainer member or barrier film portion of the foam member;
and clamping the retainer member against the barrier film portion of the foam applique member to capture and activate the adhesive monomer and the accelerator component therebetween to form a bond of sufficient strength.

2. In a method of making a composite foam part with preformed components having a three dimensional fit including adhering a foam applique to a rigid retainer member at three dimensional points thereon, the improvement comprising:

forming the retainer member;

forming a foam applique member by placing an outer skin portion and an inner barrier film portion in a mold, pouring a precursor of the foam material therebetween, foaming and setting the foam material to form the integral foam member;

and then applying contact curable adhesive monomer to at least one of the retainer member or barrier film portion of the foam member;

applying an accelerator component of said adhesive monomer to the other of the retainer member or barrier film portion of the foam member;

and clamping the retainer member against the barrier film portion of the foam applique member to capture and activate the adhesive monomer and the accelerator component therebetween to form a bond therebetween at cure times less than five minutes at room temperature.

* * * * *